(12) United States Patent
Garcia

(10) Patent No.: US 9,593,968 B1
(45) Date of Patent: Mar. 14, 2017

(54) MECHANICAL ACCELERATION SENSOR AND INDICATOR TUBE SYSTEM

(71) Applicant: Jessica Noel Garcia, Clifton, NJ (US)

(72) Inventor: Jessica Noel Garcia, Clifton, NJ (US)

( * ) Notice: Subject to any disclaimer, the term of this patent is extended or adjusted under 35 U.S.C. 154(b) by 517 days.

(21) Appl. No.: 14/245,150

(22) Filed: Apr. 4, 2014

Related U.S. Application Data

(60) Provisional application No. 61/809,296, filed on Apr. 6, 2013.

(51) Int. Cl.
*G01P 15/00* (2006.01)
*G01D 7/00* (2006.01)

(52) U.S. Cl.
CPC ............ *G01D 7/005* (2013.01); *G01P 15/006* (2013.01)

(58) Field of Classification Search
CPC ...... G01P 15/12; G01P 15/125; G01P 15/036; A63B 2220/40; G01L 5/0052; G01C 9/10; G01H 1/00; G01B 11/20; G01B 5/30
USPC ....... 73/514.05, 514.01, 488, 649, 762, 760; 33/365; 116/203
See application file for complete search history.

(56) References Cited

U.S. PATENT DOCUMENTS

| | | | | |
|---|---|---|---|---|
| 7,080,553 B2* | 7/2006 | Luo | ...................... | G01P 15/0897 73/514.05 |
| 7,568,390 B2* | 8/2009 | Shizuno | .................. | G01P 1/023 73/493 |
| 8,387,552 B2* | 3/2013 | Branch | .................. | G01L 5/0052 116/203 |
| 9,103,849 B2* | 8/2015 | Branch | .................... | G01P 15/04 |
| 9,116,058 B2 | 8/2015 | Branch | | |
| 9,190,229 B2* | 11/2015 | Branch | ................ | H01H 29/002 |
| 2002/0189349 A1* | 12/2002 | Ploechinger | .......... | G01P 15/008 73/488 |
| 2014/0196294 A1* | 7/2014 | Branch | .................... | G01C 9/08 33/365 |

* cited by examiner

*Primary Examiner* — Lisa Caputo
*Assistant Examiner* — Nigel Plumb
(74) *Attorney, Agent, or Firm* — Joseph E. Maenner; Maenner & Associates, LLC

(57) ABSTRACT

A sensing device includes a housing and at least one film extending across the housing. The at least one film divides the housing into a first compartment and a second compartment. At least one mass is disposed within the first compartment. The at least one mass id sized to rupture the at least one film. A fluid having a first color is disposed in the first compartment and a fluid having a second color is disposed in the second compartment.

20 Claims, 16 Drawing Sheets

100

100

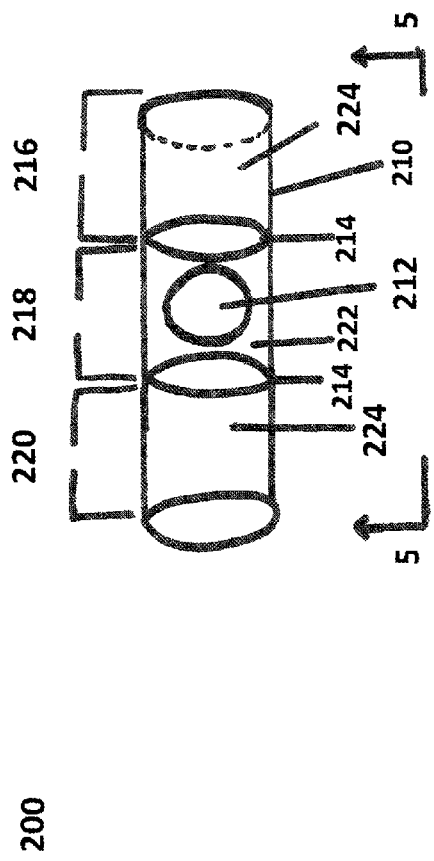
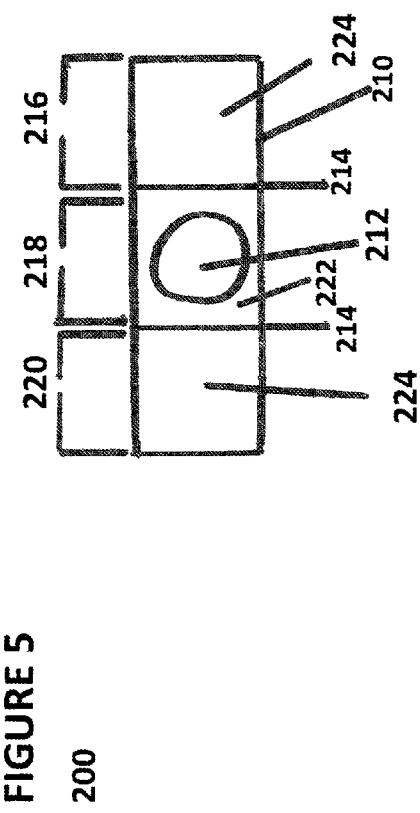
FIGURE 4
200
FIGURE 5
200

300

300

300

400

400

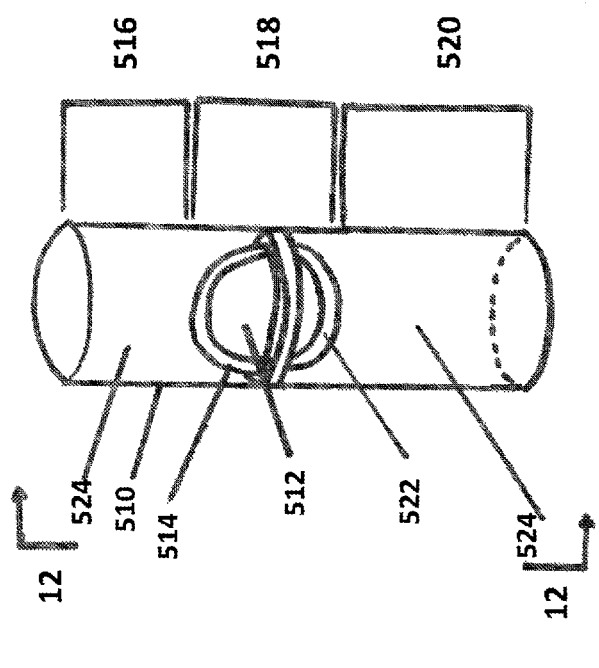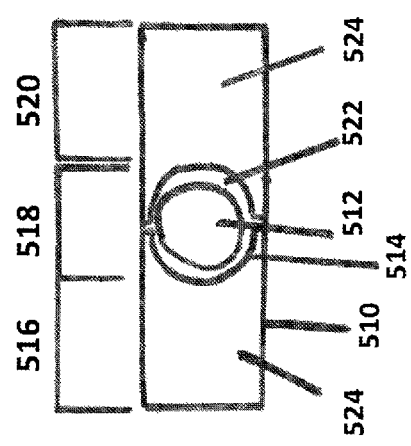
FIGURE 11
FIGURE 12

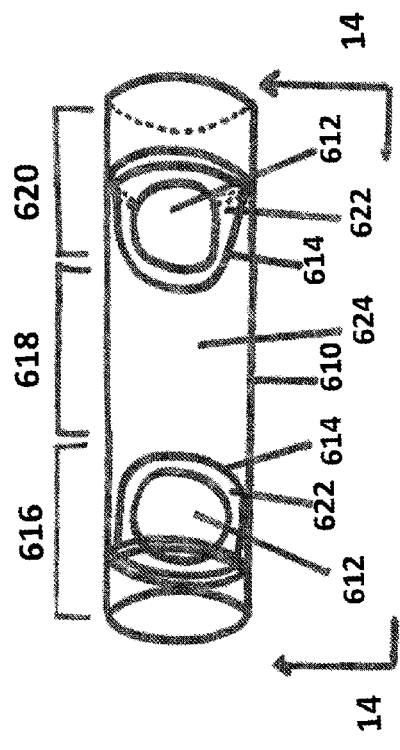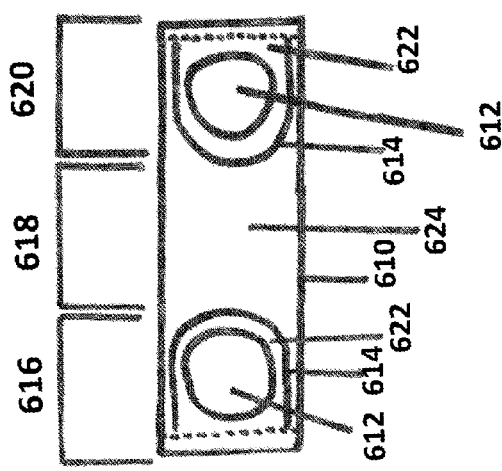
FIGURE 13
600
FIGURE 14
600

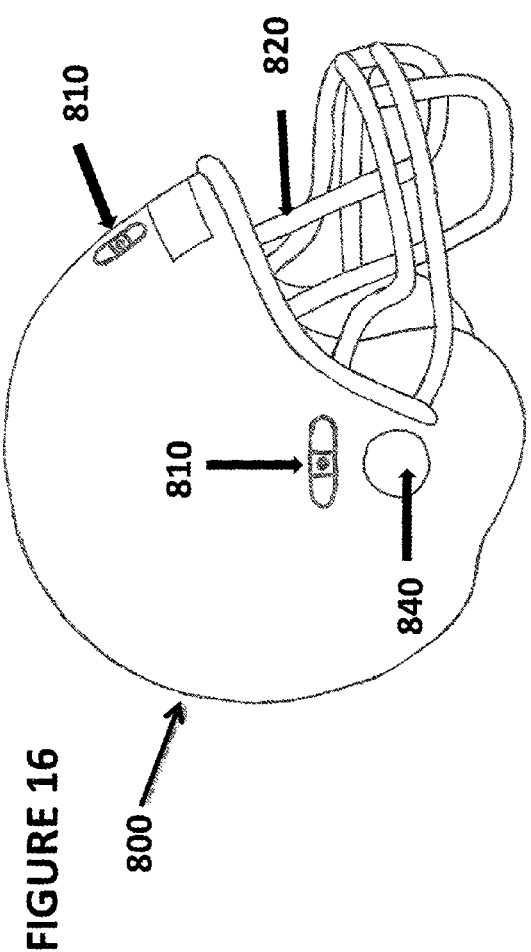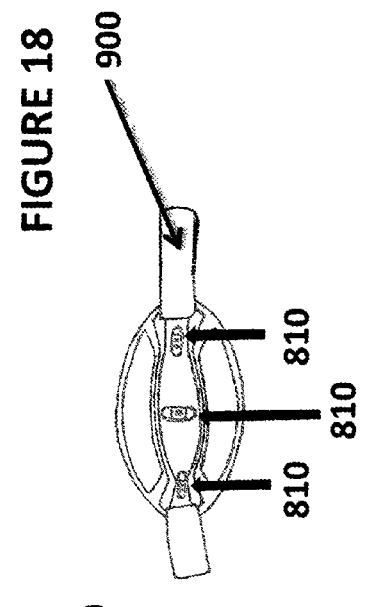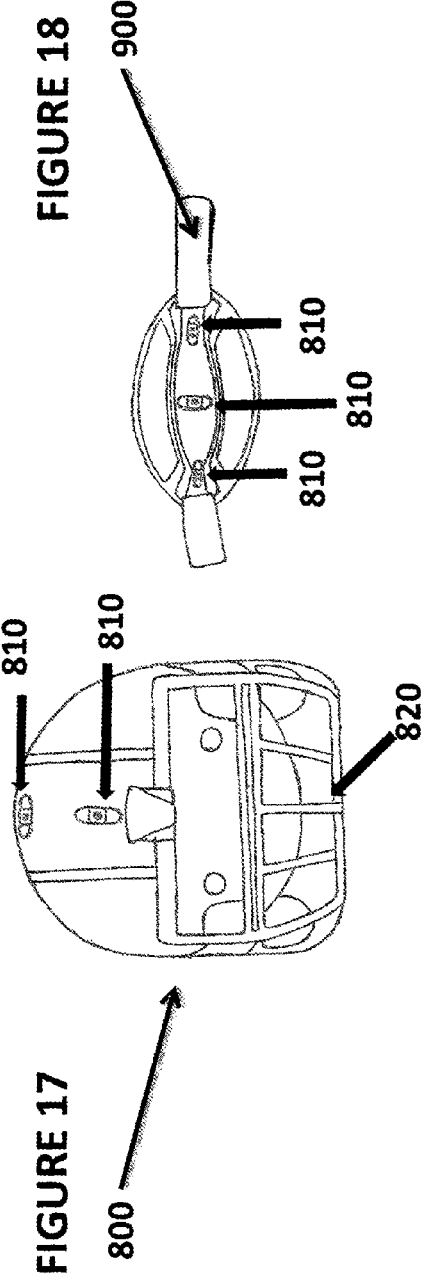

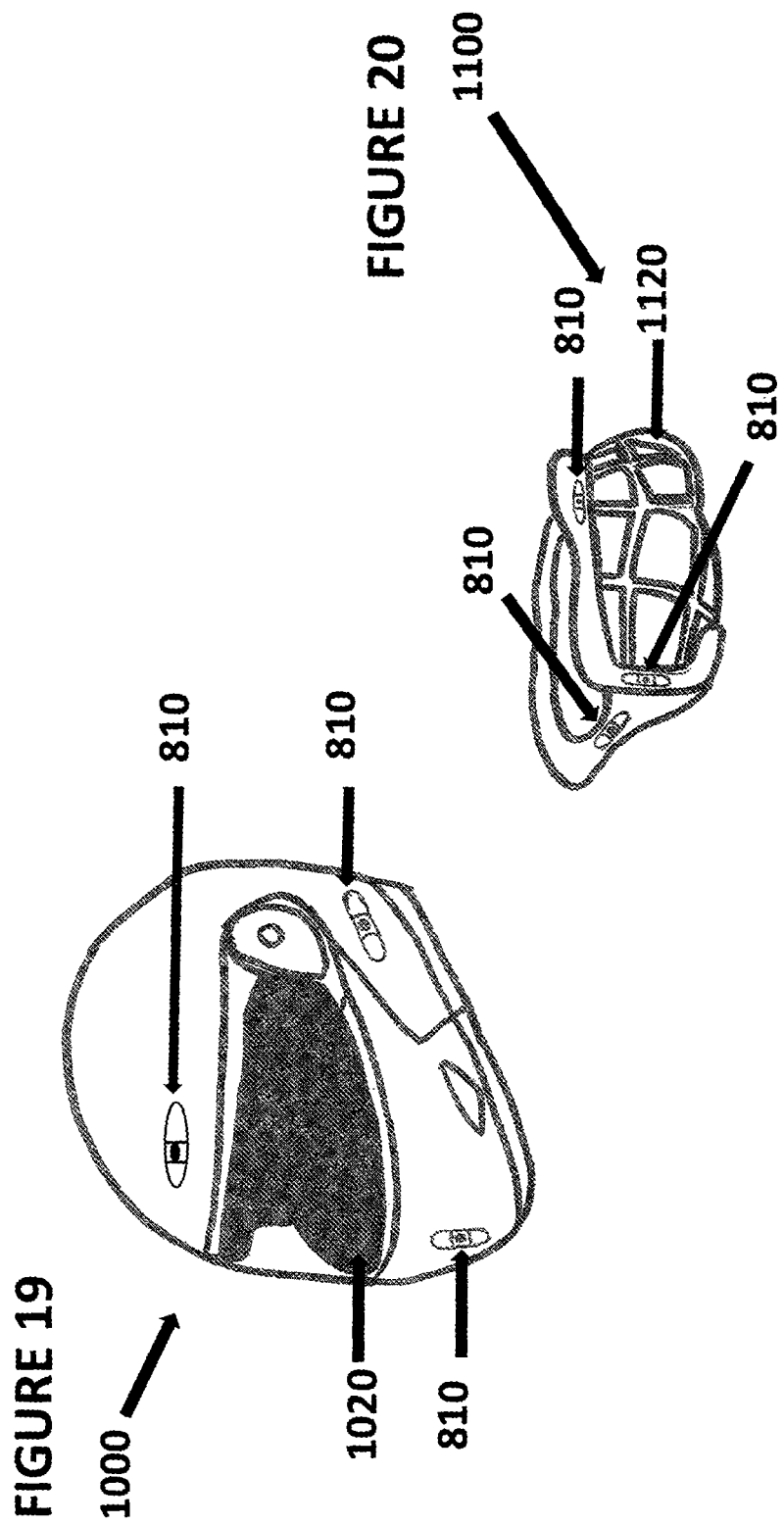

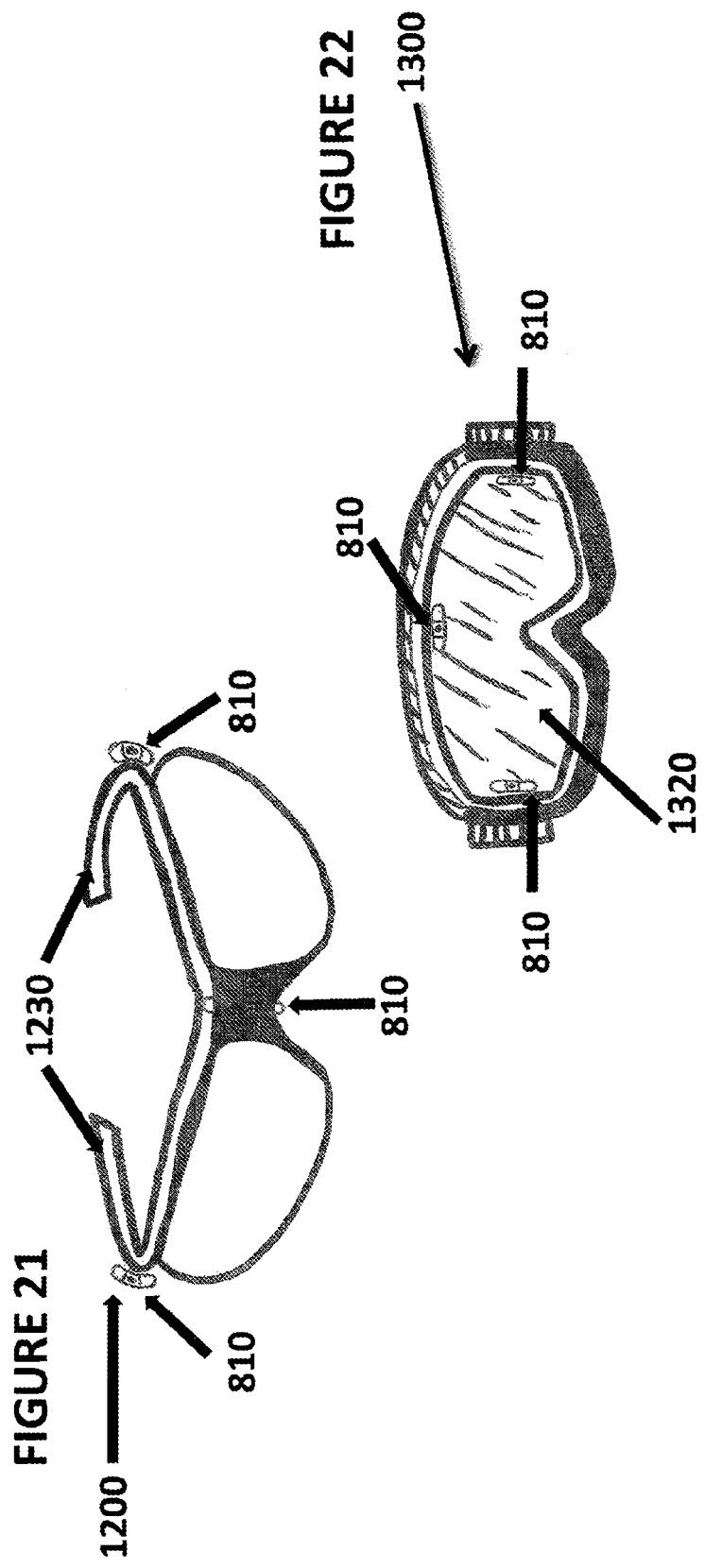

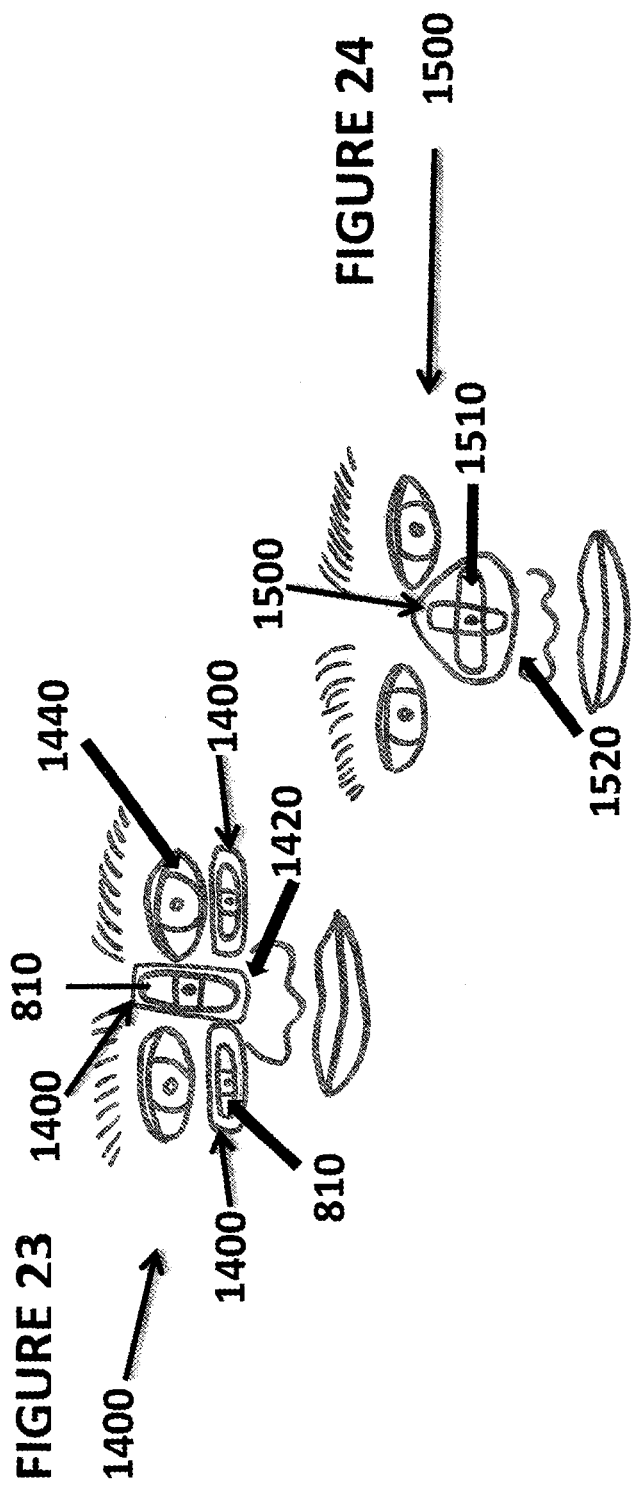

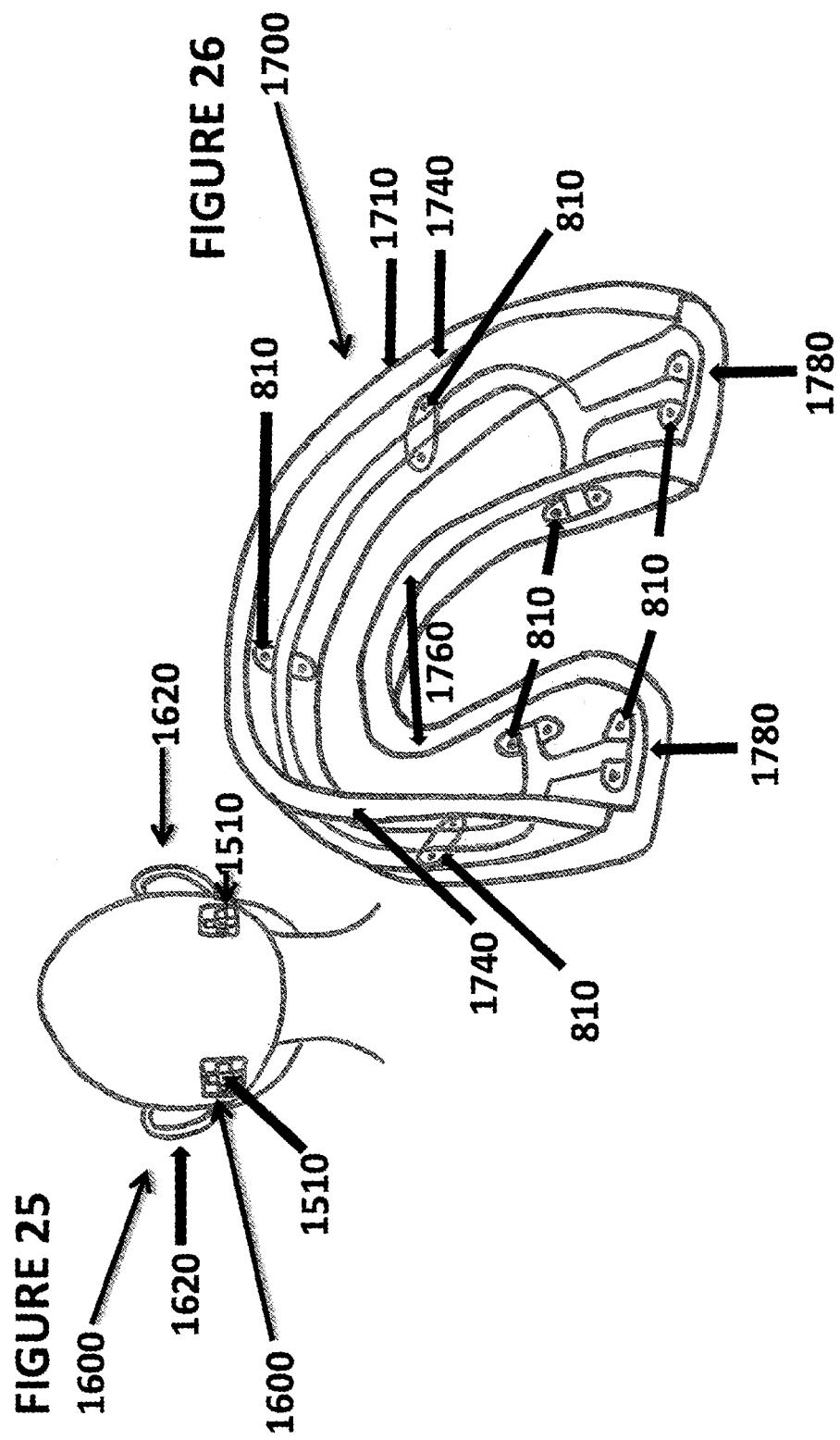

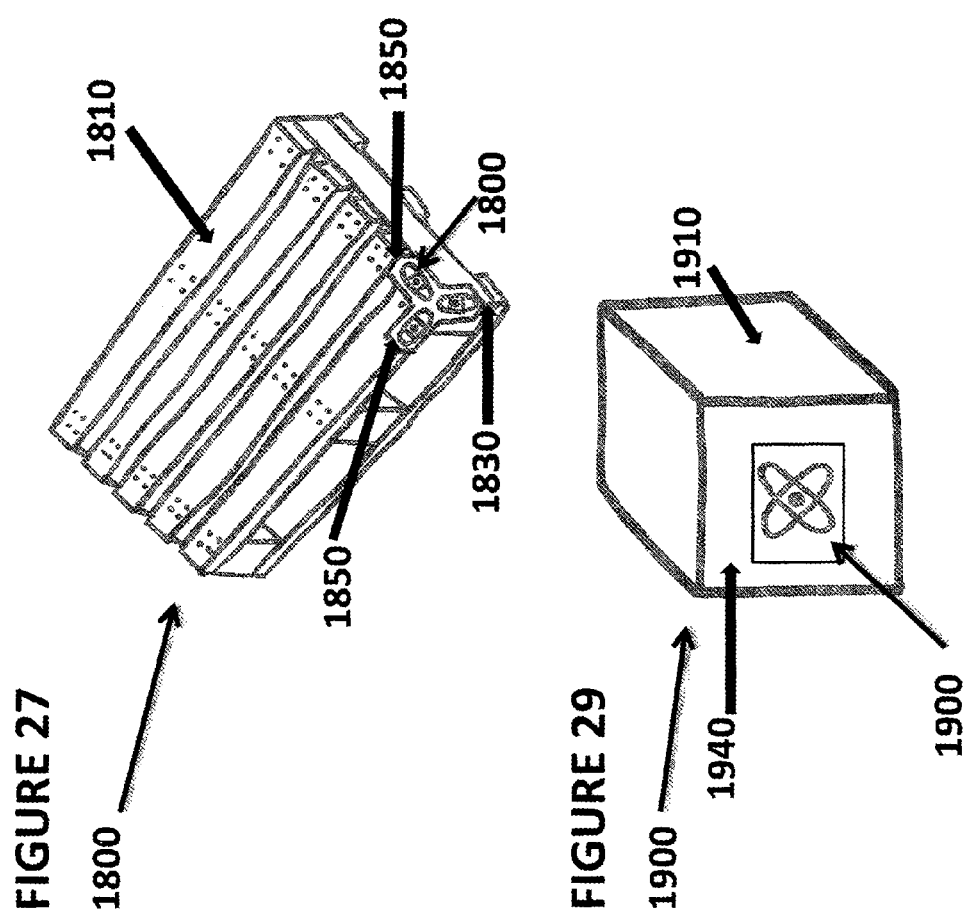

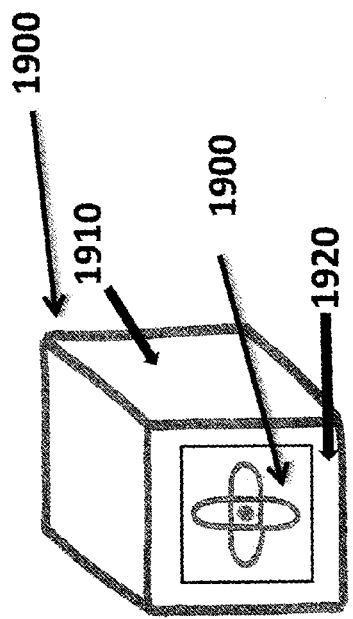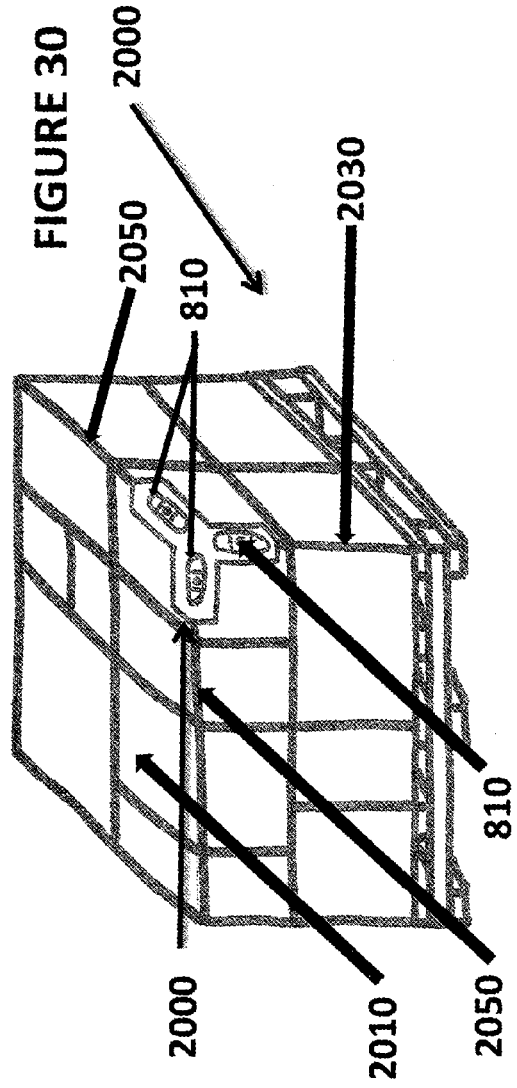

MECHANICAL ACCELERATION SENSOR AND INDICATOR TUBE SYSTEM

CROSS-REFERENCE TO RELATED APPLICATIONS

The present application claims priority from U.S. Provisional Patent Application Ser. No. 61/809,296, filed on Apr. 4, 2013, which is incorporated by reference herein in its entirety.

BACKGROUND OF THE INVENTION

The present invention is in the technical field of sensing devices. More particularly, the present invention is in the technical field of acceleration sensing devices. More particularly, the present invention is in the technical field of mechanical acceleration sensing devices. More particularly, the present invention is in the technical field of mechanical acceleration sensing devices with visual indicators.

BRIEF SUMMARY OF THE PRESENT INVENTION

The present invention is a mechanical acceleration sensor to indicate that a specific acceleration level has been felt. Upon acceleration of at least one mass, at a specific acceleration level, the force that is applied by the mass ruptures at least one film. Upon rupture of at least one film, fluid is released into the second compartment. The release of a fluid indicates that the sensor has felt a specific acceleration level. This is visually indicated by a change in the color of the fluid in the hollow housing. This change of color in the sensor will indicate that the sensor was excessively hit, shaken, or dropped. There are a variety of applications for this sensor to be placed on objects or people via adhesive taping as well as embedded directly into objects such as but not limited to protective sports and recreational helmets, sunglasses, goggles, facemasks, chin straps, mouth guards, medical tape, luggage tags, shipping stickers, shipping labels, pallets, etc. The above description referring to possible sensor applications are merely exemplary and do not include all possible uses and applications.

Briefly, the present invention provides a sensing device comprising a housing and at least one film extending across the housing. The at least one film divides the housing into a first compartment and a second compartment. At least one mass is disposed within the first compartment. The at least one mass id sized to rupture the at least one film. A fluid having a first color is disposed in the first compartment and a fluid having a second color is disposed in the second compartment.

Further, the present invention provides a sensing device comprising an elongate hollow housing and a frangible film disposed within the housing. The film divides the housing into a first compartment and a second compartment. A mass is disposed within the first compartment. The mass is sized to rupture the frangible film upon the application of a force directing the mass into the film, wherein the force is greater than a predetermined force. A first fluid is disposed in the first compartment. The first fluid has a first color. A second fluid is disposed in the second compartment. The second fluid has a second color.

Also, the present invention provides a sensing device assembly comprising a hollow housing and a plurality of films disposed within the housing. The plurality of films divide the housing into a plurality of compartments. A fluid is disposed within each of the plurality of compartments such that adjacent compartments contain different colored fluids. A means for rupturing the plurality of films such that at least two of the different colored fluids co-mingle is also provided.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 4 is a perspective view of a multidirectional mechanical acceleration sensor according to a second embodiment of the present invention;

FIG. 5 is a side view of the multidirectional mechanical acceleration sensor taken along lines 5-5 of FIG. 4;

FIG. 11 is a perspective view of a multidirectional mechanical acceleration sensor according to a fifth embodiment of the present invention;

FIG. 12 is a side view of the multidirectional mechanical acceleration sensor taken along lines 12-12 of FIG. 11;

FIG. 13 is a perspective view of a multidirectional mechanical acceleration sensor according to a sixth embodiment of the present invention;

FIG. 14 is a side view of the multidirectional mechanical acceleration sensor taken along lines 14-14 of FIG. 13;

FIG. 16 is a perspective view of a football helmet onto which a plurality of mechanical acceleration sensors according to the present invention are mounted;

FIG. 17 is a front elevational view of the football helmet shown in FIG. 16;

FIG. 18 is a top plan view of a chin strap for the football helmet shown in FIGS. 16 and 17, incorporating a plurality of mechanical acceleration sensors according to the present invention therein;

FIG. 19 is a perspective view of a motorcycle helmet onto which a plurality of mechanical acceleration sensors according to the present invention are mounted;

FIG. 20 is a perspective view of a facemask onto which a plurality of mechanical acceleration sensors according to the present invention are mounted;

FIG. 21 is a front elevational view of sunglasses onto which a plurality of mechanical acceleration sensors according to the present invention are mounted;

FIG. 22 is a front elevational view of goggles onto which a plurality of mechanical acceleration sensors according to the present invention are mounted;

FIG. 23 is a front elevational view of a face onto which a plurality of mechanical acceleration sensors according to the present invention are mounted;

FIG. 24 is a front elevational view of a face onto which a mechanical acceleration sensor according to the present invention is mounted;

FIG. 25 is a front elevational view of the back of a person's head onto which a plurality of mechanical acceleration sensors according to the present invention are mounted;

FIG. 26 is a perspective view of a mouth guard onto which a plurality of mechanical acceleration sensors are mounted to an indicator tube system according to the present invention;

FIG. 27 is a perspective view of a pallet onto which a plurality of mechanical acceleration sensors according to the present invention are mounted;

FIGS. 28 and 29 are perspective views of boxes onto which a mechanical acceleration sensor according to the present invention are mounted;

FIG. 30 is a perspective view of a plurality of boxes onto which a plurality of mechanical acceleration sensors according to the present invention are mounted;

DETAILED DESCRIPTION OF THE INVENTION

Figure 1A:
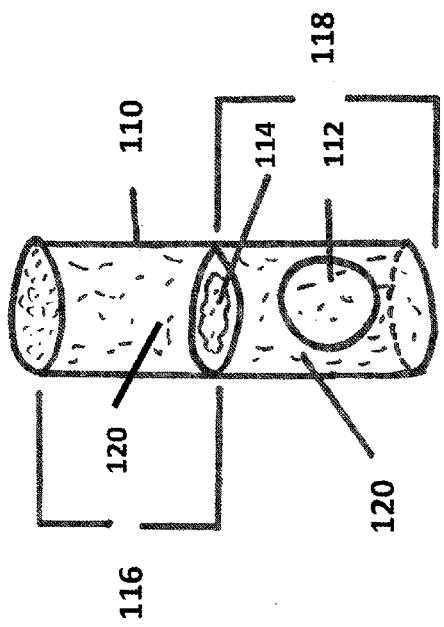
FIG. 1A is a perspective view of a ruptured mechanical acceleration sensor according to the first embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

A mechanical acceleration sensor according to the several embodiments of the present invention is used to sense linear forces of a given mass. The inventive sensor is mounted on an adhesive strip and can be placed anywhere the user chooses or embedded directly into a piece of equipment or product. The inventive sensor allows a user to view the sensor and determine whether a predetermined acceleration has been experienced by the piece of equipment or adhesive strip along a particular axis or a combination of axes.

Figure 1:
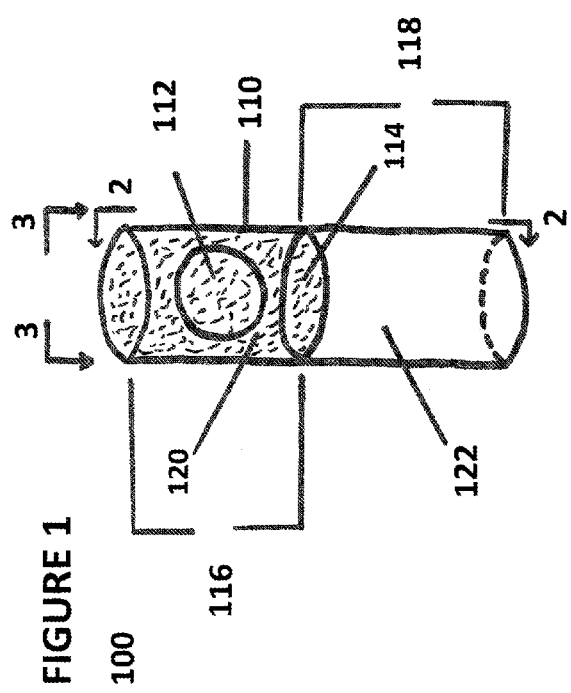
FIG. 1 is a perspective view of a mechanical acceleration sensor according to a first embodiment of the present invention.
Figure 2:
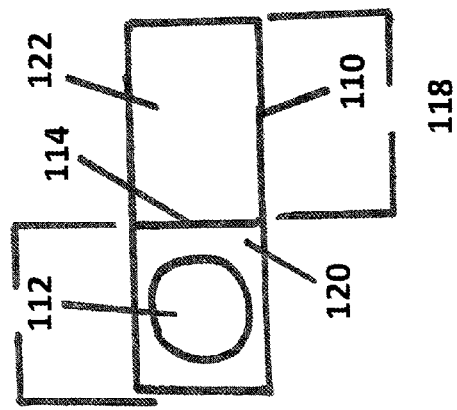
FIG. 2 is a side view of the mechanical acceleration sensor taken along lines 2-2 of FIG. 1.
Figure 3:
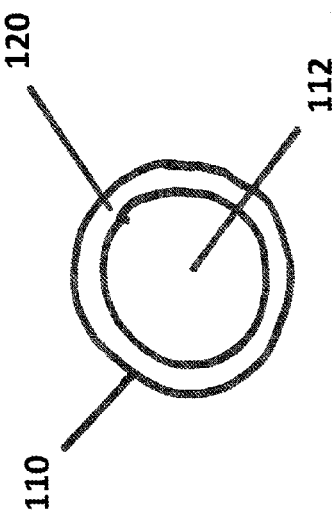
FIG. 3 is a top view of the mechanical acceleration sensor taken along lines 3-3 of FIG. 1.

Referring now to the invention in more detail, in FIG. 1 to FIG. 3 there is shown a sensing device 100 being composed of a housing 110 that contains at least one mass 112 that is disposed within a first compartment 116 being sized to rupture the at least one film 114. Film 114 is constructed from a frangible material that divides the housing 110 into first compartment 116 and a second compartment 118. A fluid of a blue color 120 is disposed in the first compartment 116 and a fluid of a transparent color 122 is disposed in the second compartment 118. While a blue color is used for the fluid in first compartment 114 and a transparent color is used for the fluid in second compartment 118, those skilled in the art will recognize that any colors can be used, as long as, after film 114 is ruptured and the two fluids intermix, an observer can visually see that the two fluids have intermixed as a result of the breaking of film 114. Further, while blue and transparent are used throughout this document as exemplary colors, those skilled in the art will recognize that other color combinations may be used instead.

In more detail, still referring to the invention of FIG. 1 to FIG. 3, the sensing device 100 indicates when a specific acceleration level has been felt. Mass 112 surrounded by a blue fluid 118 is separated from the transparent fluid 120 by film 114 in one direction. Alternatively, a transparent fluid 120 can surround the mass 112 and a blue fluid 120 can be on the other side of film 114. Upon acceleration of mass 112, the force that is applied by mass 112 against film 114 at a specific acceleration level ruptures film 114. Upon rupture of film 114, a blue fluid 120 is released into a transparent fluid 122. The release of blue fluid 120 indicates that the sensing device 100 has experienced a specific acceleration level. This is visually indicated by a change in the color of the transparent fluid 122 in the hollow housing 110. The change in color results from the combination of the fluid having a blue color 120 into a fluid having a transparent color 122.

In further detail, still referring to the invention of FIG. 1 to FIG. 3, the sensing device 100 is primarily made of a hollow housing 110 that is sufficiently wide and long to accommodate at least one mass 112, at least one film 114, a fluid of a blue color 120, and a fluid of a transparent color 122. The width of the housing 110 can range from about 1/32 to about 2 inches and the length of the housing 110 can range from about 1/8 to about 12 inches. The sensing device 100 can be designed to rupture at a specific acceleration. Mass 112 is sized to rupture film 114 of a given thickness. Mass 112 can range from about 0.01 grams to 15 grams. Film 114 can range from about 0.01 mm to about 10 mm in thickness. Different accelerations will be needed to rupture differing ranges of film 114.

The construction details of the invention as shown in FIG. 1 to FIG. 3 are that the sensing device 100 may be made of a variety of materials. The housing 110 may be composed of a strong, rigid, yet translucent or transparent material such as plastic or any other sufficient material. Mass 112 may be composed of a type of metal, ceramic, or compressed powder. Frangible film 114 may be composed of single sheet or a composite of many sheets composed of plastic, metal, ceramic, or synthetic materials. The fluid of a blue color 120 may either be of liquid composition or powder in liquid suspension and the fluid of a transparent color 122 may be of any clear chemical composition, including a gas. This sensing device 100 is used to show acceleration in one direction to break film 114 and the acceleration of the sensing device 100 in the opposite direction or along other axes will just drive mass 112 against the wall of the housing 110.

Referring still to the invention in more detail, in FIG. 4 to FIG. 5 there is shown an alternative embodiment of a sensing device 200 being composed of a hollow housing 210 wherein at least one frangible film 214 comprises two films 214, and wherein at least one mass 212 is disposed between the two films 214, creating separate compartments. Films 214 divides the housing 210 into the first end compartment 216, central compartment 218, and second end compartment 220. Mass 212, sized to rupture the films 214, is disposed within the central compartment 218. The central compartment 218 contains a fluid of a blue color 222 and the first end compartment 216 and second end compartment 220 contain a fluid of a transparent color 224.

In more detail, still referring to the embodiment of FIG. 4 to FIG. 5, the sensing device 200 indicates when a specific acceleration level has been felt. Mass 212 surrounded by a fluid of a blue color 222 is separated from two compartments 216, 220 filled with a fluid of a transparent color 224 by films 214. Upon acceleration of mass 212, the force that is applied by mass 212 at a specific acceleration level ruptures one of the films 214. Upon rupture the film 214, and depending on which film 214 is ruptured, a fluid of a blue color 222 is released into either the first end compartment 216 or second end compartment 220 with fluid of a transparent color 224. The release of a fluid of a blue color 222 indicates that the sensing device 200 has felt a specific acceleration level in at least one direction. This is visually indicated by a change in the color of the first end compartment 216 or second end compartment 220 filled with fluid of a transparent color 224 in the hollow housing 210. The change in color results from the comingling of the fluid having a blue color 222 into a fluid having a transparent color 224.

In further detail, still referring to the invention of FIG. 4 to FIG. 5, the sensing device 200 is primarily made of a hollow housing 210 that is sufficiently wide and long to accommodate mass 212, wherein the frangible film 214 comprises two films 214, a fluid having a blue color 222, and a first end compartment 216 and second end compartment 220 filled with a fluid having a transparent color 224. The width of the hollow housing 210 can range from about 1/32 to about 2 inches and the length of the housing 210 can range from about 1/8 to about 12 inches. The sensing device 200 can be designed to rupture at a specific acceleration. Mass 212 is sized to rupture film 214 of a given thickness. Mass 212 can range from about 0.01 gram to about 15 grams. Each of films 214 can range from about 0.01 mm to about 10 mm thickness. Different accelerations will be needed to rupture differing ranges of frangible films 214.

The construction details of the invention as shown in FIG. 4 to FIG. 5 are that the sensing device 200 may be made of a variety of materials. The hollow housing 210 may be composed of a strong, rigid, yet translucent or transparent material such as plastic or any other sufficient material. Mass 212 may be composed of a type of metal, ceramic, or compressed powder. Each film 214 may be composed of single sheet or a composite of many sheets composed of plastic, metal, ceramic, or synthetic materials. The fluid of a blue color 222 may either be of liquid composition or powder suspended in liquid and the fluid of a transparent color 224 may be of any clear chemical composition, including a gas. This sensing device 200 is intended to show acceleration in one direction to break one of the frangible films 214 and the acceleration of the sensing device 200 in the opposite direction or along other axes will break the opposing film 214.

Figure 6:
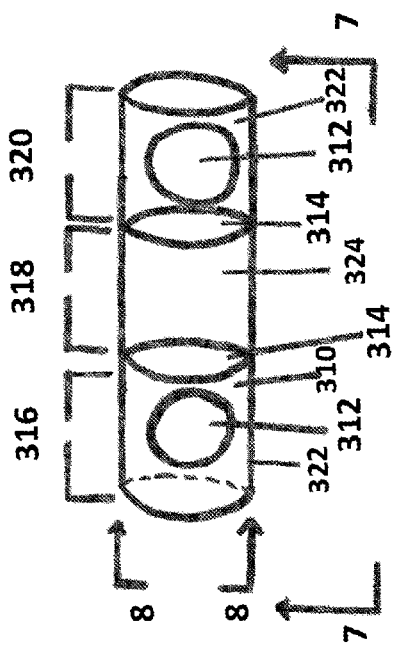
FIG. 6 is a perspective view of a multidirectional mechanical acceleration sensor according to a third embodiment of the present invention.
Figure 7:
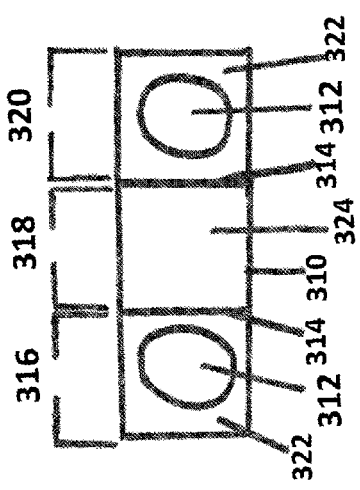
FIG. 7 is a side view of the multidirectional mechanical acceleration sensor taken along lines 7-7 of FIG. 6.
Figure 8:
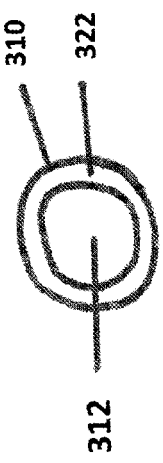
FIG. 8 is a top view of the mechanical acceleration sensor taken along lines 8-8 of FIG. 6.

Referring now to the invention in more detail, in FIG. 6 to FIG. 8, there is shown an alternative embodiment of a sensing device 300 being composed of a hollow housing 310 wherein at least one frangible film 314 comprises two films 314 and wherein at least one mass 312 comprises two masses 312, and wherein the two films 314 are disposed between the two masses 312 dividing the body 310 into a first end compartment 316, a central portion 318, and a second end compartment 320 separated by films 314 extending across the hollow housing 310. Each mass 312 is sized to rupture an adjacent film 314. One mass 312 is disposed within the first end compartment 316 and another mass 312 is disposed within second end compartment 320 having a fluid of a blue color 322. Central portion 318 has a fluid of a transparent color 324.

In more detail, still referring to the invention of FIG. 6 to FIG. 8, the sensing device 300 indicates when a specific acceleration level has been felt. The first end compartment 316 and second end compartment 320, each containing a mass 312, has a blue fluid 322 and are found on opposing ends of the hollow housing 310. The central portion 318 having a fluid of a transparent color 324 is separated from the first end compartment 316 and second end compartment 320, wherein the two films 314 are disposed between the two masses 312.

Upon acceleration of at least one of the masses 312, the force that is applied by the mass 312 at a specific acceleration level ruptures the adjacent film 314. Upon rupture of film 314, a blue fluid 322 is released into the central portion 318, combining with transparent fluid 324. The release of blue fluid 322 indicates that the sensing device 300 has felt a specific acceleration level in at least one direction. This is visually indicated by a change in the color of the central portion 318 in the hollow housing 310. The change in color results from the comingling of the fluid of a blue color 322 into a fluid of a transparent color 324.

In further detail, still referring to the invention of FIG. 6 to FIG. 8, the sensing device 300 is primarily made of a hollow housing 310 that is sufficiently wide and long to accommodate at least one mass 312, wherein the at least one mass 312 comprises two masses 312, a frangible film 314, wherein the frangible film 314 comprises two films 314, a first end compartment 316 and second end compartment 320 having a fluid of a blue color 322, and a central portion 318 filled with a fluid of a transparent color 324. The width of the hollow housing 310 can range from about 1/32 to about 2 inches and the length of the housing 310 can range from about 1/8 to about 12 inches. The sensing device 300 can be designed to rupture at a specific acceleration. Each mass 312 is sized to rupture an adjacent film 314 of a given thickness. Each mass 312 can range from about 0.01 grams to about 15 grams. Each frangible film 314 can range from about 0.01 mm to about 10 mm thickness. Different accelerations will be needed to rupture differing ranges of films 314.

The construction details of the invention as shown in FIG. 6 to FIG. 8 are that the sensing device 300 may be made of a variety of materials. The housing 310 may be composed of a strong, rigid, yet translucent or transparent material such as plastic or any other sufficient material. Each mass 312 may be composed of a type of metal, ceramic, or compressed powder. Each frangible film 314 may be composed of single sheet or a composite of many sheets composed of plastic, metal, ceramic, or synthetic materials. The fluid of a blue color 322 may either be of liquid composition or powder in liquid suspension and the fluid of a transparent color 324 may be of any clear viscous chemical composition. This sensing device 300 is only good to show acceleration in one direction to break one film 314 and the acceleration of the sensing device 300 in the opposite direction or along other axes will break the other film 314.

Figure 9:
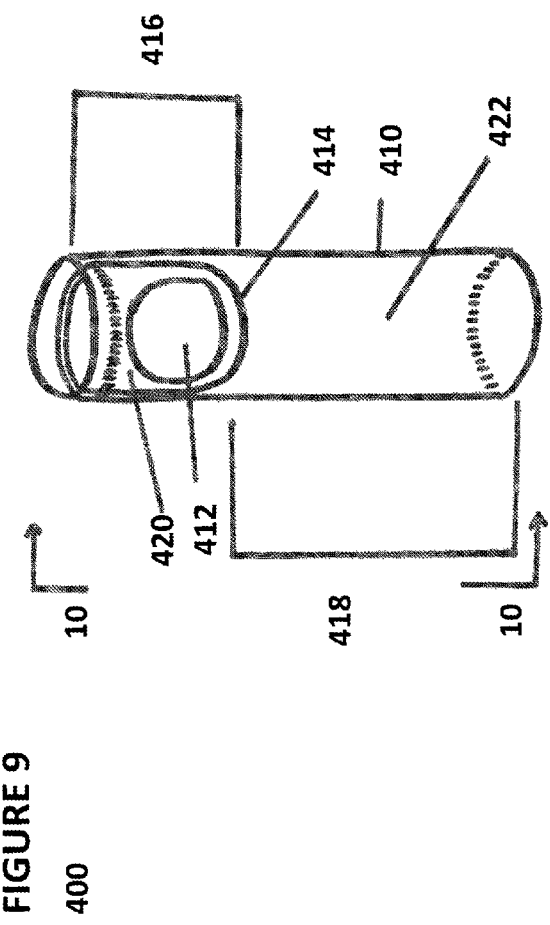
FIG. 9 is a perspective view of the mechanical acceleration sensor according to a fourth embodiment of the present invention.
Figure 10:
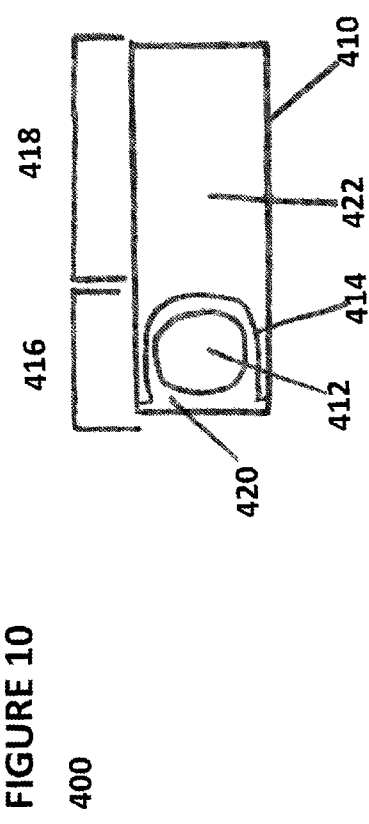
FIG. 10 is a side view of the mechanical acceleration sensor taken along lines 10-10 of FIG. 9.

Referring now to the invention in more detail, in FIG. 9 to FIG. 10 there is shown a sensing device 400 being composed of a hollow housing 410 wherein at least one mass 412 is disposed between portions wherein the a film 414 has a concave portion. A film 414 has a concave portion and divides the hollow housing 410 into a first compartment 416 and second compartment 418. A fluid having a blue color 420 is disposed in the first compartment 416 and a fluid having a transparent color 422 is disposed in the second compartment 418.

In more detail, still referring to the invention of FIG. 9 to FIG. 10, the sensing device 400 indicates when a specific acceleration level has been felt. Mass 412 surrounded by a fluid having a blue color 420 is separated from a fluid having a transparent color 422 by film 414 in one direction. Alternatively, a fluid having a transparent color 422 can surround the mass 412 and a fluid having a blue color 420 can be on the other side of the frangible film 414 with a concave portion. Upon acceleration of mass 412, the force that is applied by mass 412 at a specific acceleration level ruptures film 414. Upon rupture of film 414, a fluid having a blue color 420 is released into a fluid having a transparent color 422. The release of a fluid having a blue color 420 indicates that the sensing device 400 has felt a specific acceleration level. This is visually indicated by a change in the color of the transparent fluid 422 in the hollow housing 410. The change in color results from the comingling of the fluid having a blue color 420 into a fluid having a transparent color 422.

In further detail, still referring to the invention of FIG. 9 to FIG. 10, the sensing device 400 is primarily made of a hollow housing 410 that is sufficiently wide and long to accommodate at least one mass 412, at least one frangible film 414 that has a concave portion, having a fluid of a blue color 420, and a fluid of a transparent color 422. The width of the hollow housing 410 can range from about 1/32 to about 2 inches and the length of the hollow housing 410 can range from about 1/8 to about 12 inches. The sensing device 400 can be designed to rupture at a specific acceleration. Mass 412 is sized to rupture frangible film 414 of a given thickness that has a concave portion. Mass 412 can range from about 0.01 gram to about 15 grams. Film 414 can range from about 0.01 mm to about 10 mm thickness. Different accelerations will be needed to rupture differing ranges of the film 414.

The construction details of the invention as shown in FIG. 9 to FIG. 10 are that the sensing device 400 may be made of a variety of materials. The hollow housing 410 may be composed of a strong, rigid, yet translucent or transparent material such as plastic or any other sufficient material. The mass 412 may be composed of a type of metal, ceramic, or compressed powder. Frangible film 414 that has a concave portion may be composed of single sheet or a composite of many sheets composed of plastic, metal, ceramic, or synthetic materials. The fluid of a blue color 420 may either be of liquid composition or powder in liquid suspension and the fluid of a transparent color 422 may be of any clear chemical composition, including a gas. This sensing device 400 is good to show acceleration in one direction to break frangible film 414 having a concave portion and the movement of the sensing device 400 in the opposite direction or along other axes will just drive mass 412 against the wall of the hollow housing 410 and will not break film 414 having a concave portion.

Referring now to the invention in more detail, in FIG. 11 to FIG. 12 there is shown a sensing device 500 being composed of a hollow housing 510 wherein the at least one frangible film 514 comprises two films having a concave portion, and wherein mass 512 is disposed between the two concave portions creating separate compartments. Films 514 extend across the housing 510, dividing housing 510 into first end compartment 516, central compartment 518, and second end compartment 520. A mass 512 sized to rupture frangible films 514 having a concave portion is disposed within the central compartment 518. The central compartment 518 contains a fluid of a blue color 522 and the first end compartment 516 and second end compartment 520 contain a fluid of a transparent color 524.

In more detail, still referring to the embodiment of FIG. 11 to FIG. 12, the sensing device 500 indicates when a specific acceleration level has been felt. At least one mass 512 surrounded by a fluid of a blue color is separated from two compartments filled with a fluid of a transparent color 524 wherein the at least one film 514 comprises two films 514 having concave portions. Upon acceleration of mass 512, the force that is applied by mass 512 at a specific acceleration level ruptures at least one film 514 having a concave portion. Upon rupture of film 514 having a concave portion, a fluid of a blue color 522 is released into either the first end compartment 516 or second end compartment 520 with fluid of a transparent color 524. The release of a blue fluid 522 indicates that the sensing device 500 has felt a specific acceleration level in at least one direction. This is visually indicated by a change in the color of the first end compartment 516 or second end compartment 520. The change in color results from the comingling of the fluid having a blue color 522 into a fluid having a transparent color 524.

In further detail, still referring to the invention of FIG. 11 to FIG. 12, the sensing device 500 is primarily made of a hollow housing 510 that is sufficiently wide and long to accommodate at least one mass 512, wherein the at least one frangible film 514 comprises two films 514 having concave portions, a fluid having a blue color 522 filing a central compartment 518, and a first end compartment 516 and second end compartment filled with a fluid having a transparent color 524. The width of the housing 510 can range from about 1/32 to about 2 inches and the length of the housing 510 can range from about 1/8 to about 12 inches. The sensing device 500 can be designed to rupture at a specific acceleration. A mass 512 is sized to rupture a frangible film 514 having a concave portion of a given thickness. A mass 512 can range from about 0.01 grams to about 15 grams. Each frangible film 514 has concave portions can range from about 0.01 mm to about 10 mm thickness. Different accelerations will be needed to rupture differing ranges of film 514 having a concave portion.

The construction details of the invention as shown in FIG. 11 to FIG. 12 are that the sensing device 500 may be made of a variety of materials. The housing 510 may be composed of a strong, rigid, yet translucent or transparent material such as plastic or any other sufficient material. Mass 512 may be composed of a type of metal, ceramic, or compressed powder. Frangible film 514 having a concave portion may be composed of single sheet or a composite of many sheets composed of plastic, metal, ceramic, or synthetic materials. The fluid of a blue color 522 may either be of liquid composition or powder in liquid suspension and the fluid of a transparent color 524 may be of any clear chemical composition, including a gas. This sensing device 500 is good to show acceleration in one direction to break one of the films 514 that has a concave portion and the movement of the sensing device 500 in the opposite direction or along other axes will break the other film 514 that has a concave portion.

Referring now to the invention in more detail, in FIG. 13 and FIG. 14, there is shown an alternative embodiment of a sensing device 600 being composed of a hollow housing 610 wherein each of the two films 614 has a concave portion and wherein each mass 612 is disposed within a respective one of the concave portions creating a first end compartment 616, central compartment 618, and second end compartment 320 separated by at least one film 614 with a concave portion extending across the housing 610. A mass 612 sized to rupture the a frangible film 614 that has a concave portion is disposed within the first end compartment 616 and second end compartment 620 having a fluid of a blue color 622 and the central compartment 618 having a fluid of a transparent color 624.

In more detail, still referring to the invention of FIG. 13 and FIG. 14, the sensing device 600 indicates when a specific acceleration level has been felt. The first end compartment 616 and second end compartments 620 containing a mass 612 having a fluid of a blue color 622 are disposed within a respective one of the concave portions. The central compartment 618 having a fluid of a transparent color 624 is separated from the first end compartment 616 and second end compartments 620 containing masses 612, and where the two frangible films 614 have concave portions are disposed between the two masses 612. Upon acceleration of at least one of the masses 612, the force that is applied by at least one of the masses 612 at a specific acceleration level ruptures the adjacent film 614 that has a concave portion. Upon rupture of film 614 that has a concave portion, a fluid of a blue color 622 is released into the central compartment 618 combining with fluid of a transparent color 624. The release of a fluid of a blue color 622 indicates that the sensing device 600 has felt a specific acceleration level in at least one direction. This is visually indicated by a change in the color of the central compartment 618 filled with transparent fluid 624 in the hollow housing 610. The change in color results from the comingling of the fluid having a blue color 622 into a fluid having a transparent color 624.

In further detail, still referring to the invention of FIG. 13 and FIG. 14, the sensing device 600 is primarily made of a hollow housing 610 that is sufficiently wide and long to accommodate at least one mass 612, wherein the at least one mass 612 comprises two masses 612, wherein the at least one film 614 comprises two films 614 that have concave portions, a first end compartment 618 and second end 620 compartment having a fluid of a blue color 622, and a central compartment 618 filled with a fluid having a transparent color 624. The width of the housing 610 can range from about 1/32 to about 2 inches and the length of the housing 610 can range from about 1/8 to about 12 inches. The sensing device 600 can be designed to rupture at a specific acceleration. A mass 612 is sized to rupture a frangible film 614 having a concave portion of a given thickness. A mass 612 can range from about 0.01 gram to about 15 grams. Each film 614 has concave portions and can range from about 0.01 mm to about 10 mm thickness. Different accelerations will be needed to rupture differing ranges of at least one film 614.

The construction details of the invention as shown in FIG. 13 and FIG. 14 are that the sensing device 600 may be made of a variety of materials. The hollow housing 610 may be composed of a strong, rigid, yet translucent or transparent material such as plastic or any other sufficient material. A mass 612 may be composed of a type of metal, ceramic, or compressed powder. A frangible film 614 having concave portions may be composed of single sheet or a composite of many sheets composed of plastic, ceramic, metal, or synthetic materials. The fluid of a blue color 622 may either be of liquid composition or powder in liquid suspension and the fluid of a transparent color 624 may be of any clear chemical composition, including a gas. This sensing device 600 is intended to show acceleration in one direction to break at least one film 614 having concave portions and the acceleration of the sensing device 600 in the opposite direction or along other axes will break the opposing at least one film 614 having concave portions.

Figure 15:
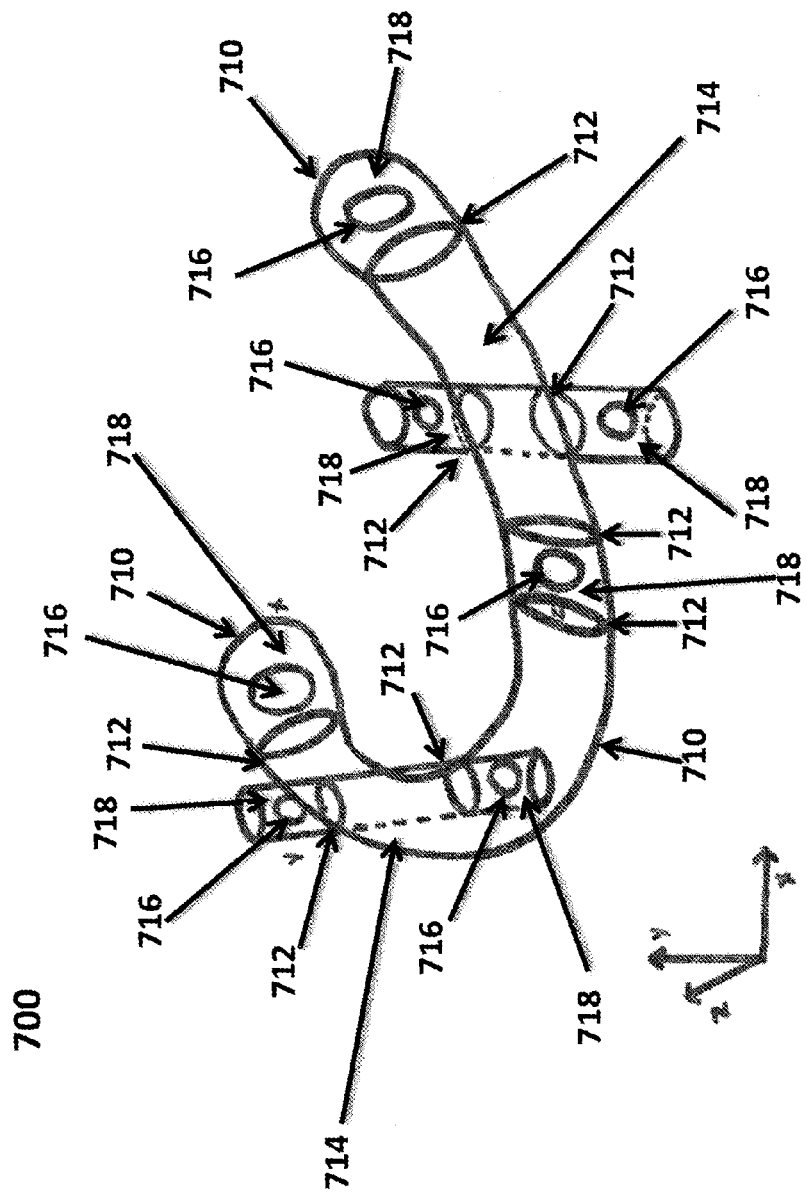
FIG. 15 is a perspective view of an indicator tube system according to a seventh embodiment of the present invention.

Referring now to the invention in more detail, in FIG. 15 there is shown a sensing device assembly 700 compromised of a hollow housing 710. Throughout the sensing device assembly 700, a plurality of films 712 disposed within the housing divide the hollow housing 710 into a plurality of compartments. The sensing device assembly 700 is oriented in a manner such that at least two of the plurality of films 712 extend orthogonally with respect to each other such that the hollow housing 710 extends in at least two planes. The sensing device assembly 700 is made from several sub compartments. Each compartment created by a plurality of films 712 in the hollow housing 710 contains a fluid 714. The fluid 714 disposed within each of the plurality of compartments such that adjacent compartments contain different colored fluids 714. The sensing device assembly 700 contains masses 716 used as a means for rupturing films 712 where each of the masses 716 are sized to rupture an adjacent plurality of films 712 upon application of a force greater than a predetermined force.

In more detail, still referring to the embodiment shown in FIG. 15, the hollow housing 710 allows multiple members of the sensing device assembly 700 to share their fluid 714 after at least one mass 716 ruptures at least one of the plurality of films 712. Upon acceleration of a force greater than a predetermined force in at least one of the members of the sensing device assembly 700 visually indicates a predetermined force has been exceeded by a change in the color in the hollow housing 710 filled with a fluid 714. The change in color results from comingling of the blue color fluid 718 into a transparent color fluid 714.

In further detail, still referring to the invention of FIG. 15 to, the sensing device assembly 700 is sufficiently wide and long enough to connect at least one or more sensing devices 700, fluid 714, and compartment to a hollow housing 710. A member of the sensing device assembly 700 is primarily made of a hollow housing 710 that is sufficiently wide and long to accommodate both the masses 716 and fluid 714. A plurality of films 712 separate the masses 716 and blue color fluid 718 from the hollow housing 710. The width of the one of the hollow housings 710 can range from about 1/32 to about 4 inches and the length of the hollow housing 710 can range from about 1/8 to about 12 inches. The sensing device assembly 700 can be designed to break at any specific acceleration, in either direction, based off the weight of the masses 716 and the thickness of at least one film 712. The masses 716 individually can range from about 0.01 gram to about 15 grams. The film 712 can range from about 0.01 mm to about 10 mm thickness per sheet. The width of the hollow housing 710 of the sensing device assembly 700 can range from 1/8 to about 4 inches.

The construction details of the invention as shown in FIG. 15 shows that the sensing device assembly 700 can be made of a variety of materials. The hollow housing 710 can be composed of a strong, rigid translucent or transparent material such as plastic or metal or any other sufficient material. The at least one mass 716 should be composed of a type of metal, ceramic, or compressed powder. The at least one film 712 may be composed of single sheet or a composite of many sheets composed of one or more plastic, metal, ceramic, or synthetic materials. The fluid 714 may either be of gas or liquid composition or powder in liquid suspension and the fluid 714 may be of any clear viscous chemical composition.

FIGS. 16 and 17 show an exemplary embodiment of sensors 100-600 (hereinafter identified collectively as sensor 810) according to the present invention mounted on a football helmet 800. At least one mechanical acceleration sensor 810 is mounted on the football helmet 800 to detect longitudinal and lateral forces, and can be placed in different locations in order to do so. In FIG. 16, a mechanical acceleration sensor 810 is mounted and oriented vertically in the center of the football helmet 800 above the facemask 820 to detect longitudinal forces. A second sensing device 810 is mounted and oriented horizontally above the ear opening of the football helmet 800 to detect lateral forces. This sensing device 810 can be placed on the same location of the football helmet's 800 opposite side. In FIG. 17, a mechanical acceleration sensor 810 is mounted and oriented perpendicular to a second mechanical acceleration sensor 810 on the center top portion of the football helmet 800 to detect lateral forces. The above placement descriptions of FIGS. 16 and 17 mechanical acceleration sensors 810 are exemplary, and can be placed in other locations.

FIG. 18 shows an exemplary embodiment of sensors 100-600 according to the present invention mounted on a chinstrap 900. At least one mechanical sensing device 810 is mounted on the chinstrap 900 to detect longitudinal and lateral forces, and can be placed in different locations in order to do so. A mechanical sensing device 810 is mounted and oriented vertically in the center of the chinstrap 900 to detect longitudinal forces. Horizontal mechanical sensing devices 810 are mounted perpendicular to the first mechanical sensing device 810 on opposing ends of the chinstrap 900 to detect lateral forces. The above placement description of FIG. 18 mechanical sensing devices 810 are exemplary.

FIG. 19 shows and exemplary embodiment of sensors 100-600 according to the present invention mounted on a motorcycle helmet 1000. At least one mechanical acceleration sensor 810 is mounted on the motorcycle helmet 1000 to detect longitudinal and lateral forces, and can be placed in different locations in order to do so. In FIG. 19, a mechanical acceleration sensor 810 is mounted and oriented vertically in the center of the motorcycle helmet 1000 below the facemask 1020 to detect longitudinal forces. A second sensing device 810 is mounted and oriented horizontally below the ear location of the motorcycle helmet 1000 to detect lateral forces. This sensing device 8100 can be placed on the same location of the motorcycle helmet's 1000 opposite side. A third mechanical acceleration sensor 810 is mounted and oriented perpendicular to the first mechanical acceleration sensor 810 on the center top portion of the motorcycle helmet 1000 to detect lateral forces. The above placement descriptions of FIG. 19 mechanical acceleration sensors 810 are exemplary.

FIG. 20 shows an exemplary embodiment of sensors 100-600 according to the present invention mounted on the facemask 1100. At least one mechanical acceleration sensor 810 is mounted on the facemask 1000 to detect longitudinal and lateral forces, and can be placed in different locations in order to do so. In FIG. 20, a first mechanical acceleration sensor 810 is mounted and oriented horizontally in the center of the facemask 1100 above the eye protection cage 1120 to detect lateral forces. A second sensing device 1130 is mounted and oriented vertically on the side of the eye protection cage 1120 to detect longitudinal forces. This sensing device 810 can be placed on the same location of the facemask's 1100 opposite side. A second mechanical acceleration sensor 810 is mounted and oriented perpendicular to the first mechanical acceleration sensor 810 on the side portion of the facemask 1100 to detect lateral forces. The above placement descriptions of FIG. 20 mechanical acceleration sensors 810 are exemplary.

FIG. 21 shows an exemplary embodiment of sensors 100-600 according to the present invention mounted on sunglasses 1200. At least one mechanical sensing device 810 is mounted on the sunglasses 1200 to detect longitudinal and lateral forces, and can be placed in different locations in order to do so. A mechanical sensing device 810 is mounted and oriented vertically in the center of the sunglasses 1200 to detect longitudinal forces. Horizontal mechanical sensing devices 810 are mounted perpendicular to the first mechanical sensing device 810 on each temple portion 1230 of the sunglasses 1200 to detect lateral forces. The above placement description of FIG. 21 mechanical sensing devices 810 are exemplary.

FIG. 22 shows an exemplary embodiment of sensors 100-600 according to the present invention mounted on goggles 1300. At least one mechanical sensing device 810 is mounted on the goggles 1300 to detect longitudinal and lateral forces, and can be placed in different locations in order to do so. A mechanical sensing device 810 is mounted and oriented horizontally in the top center portion of the lens 1320 of the goggles 1300 to detect lateral forces. Vertical mechanical sensing devices 810 are mounted perpendicular to the first mechanical sensing device 1310 on opposite ends of the goggle lens 1320 to detect lateral forces. The above placement descriptions of mechanical sensing devices 810 are exemplary.

FIG. 23 shows an exemplary embodiment of sensors 100-600 according to the present invention mounted on a plurality of adhesive strips 1400. At least one mechanical sensing device 810 is mounted on the adhesive strip 1400 to detect longitudinal and lateral forces, and can be placed in different locations in order to do so. A mechanical sensing device 810 is mounted on an adhesive strip 1400 and oriented vertically on the bridge of the nose 1420 to detect longitudinal forces. Horizontal mechanical sensing devices 810 are mounted on an adhesive strip 1400 and are placed beneath the eyes 1440 perpendicular to the first mechanical sensing device 810 to detect lateral forces. The above placement description of FIG. 23 mechanical sensing devices 810 are exemplary.

FIG. 24 shows an exemplary embodiment of sensors 100-700 (hereinafter identified collectively as sensor 1510) according to the present invention mounted on an adhesive strip 1500. One mechanical sensing device 1510 is mounted on the adhesive strip 1500 to detect longitudinal and lateral forces, and can be placed in different locations in order to do so. A mechanical sensing device 1510 is mounted on an adhesive strip 1500 and is both oriented vertically on the bridge of the nose 1520 to detect longitudinal forces and horizontally on the bridge of the nose 1520 to detect lateral forces. The above placement description of FIG. 23 mechanical sensing device 1510 is exemplary.

FIG. 25 shows an exemplary embodiment of sensors 100-700 according to the present invention mounted on a plurality of adhesive strips 1600. One mechanical sensing device 1510 is mounted on the adhesive strip 1600 to detect longitudinal and lateral forces, and can be placed in different locations in order to do so. A mechanical sensing device 1510 is mounted on an adhesive strip 1600 which is oriented both vertically to detect longitudinal forces and horizontally to detect lateral forces. The sensing devices 1510 are placed behind both ears 1620. The above placement description of FIG. 25 mechanical sensing device 1510 is exemplary.

FIG. 26 shows an exemplary embodiment of sensors 100-600 according to the present invention mounted on an indicator tube system 1700 integrated into a mouth guard 1710. At least one mechanical sensing device 8100 is mounted on the indicator tube system 1700 to detect longitudinal and lateral forces, and can be placed in different locations in order to do so. A mechanical sensing device 810 is mounted on and oriented vertically on the indicator tube system 1700 in the front and center portion of the mouth guard 1710 to detect longitudinal forces. Diagonal mechanical sensing devices 810 are mounted on indicator tube system 1700 and are placed at the midway point of the mouth guard's 1710 outer wall 1740 to detect horizontal forces. A mechanical sensing device 810 is mounted on and oriented horizontally on the indicator tube system 1700 on the rear portion of the mouth guard's 1710 inner wall 1760 to detect lateral forces. A mechanical sensing device 810 is mounted perpendicular to mechanical sensing device 810 on the indicator tube system 1700 on the floor 1780 of the mouth guard to detect lateral forces in an opposing direction. The above placement description of FIG. 26 mechanical sensing devices 810 are exemplary.

FIG. 27 shows an exemplary embodiment of sensors 100-600 according to the present invention mounted on an adhesive strip 1800 placed on a pallet 1810. At least one mechanical sensing device 810 is mounted on the adhesive strip 1800 to detect longitudinal and lateral forces, and can be placed in different locations in order to do so. A mechanical sensing device 810 is mounted on a portion of the adhesive strip 1800 and oriented vertically on the corner width 1830 of the pallet 1810 to detect longitudinal forces. Horizontal mechanical sensing devices 810 are mounted on the portions of the adhesive strip 1800 that are placed on the top edges 1850 of the pallet 1810 to detect lateral forces in opposing directions. The above placement description of FIG. 27 mechanical sensing devices 810 are exemplary.

FIGS. 28 and 29 shows an exemplary embodiment of sensors 100-700 according to the present invention mounted on an adhesive strips 1900 placed on boxes 1910. One mechanical sensing device 1510 is mounted on the adhesive strip 1900 to detect longitudinal and lateral forces, and can be placed in different locations in order to do so. In FIG. 28, a mechanical sensing device 1910 is mounted on an adhesive strip 1900 in the center of the box's side panel 1920 and is both oriented vertically to detect longitudinal forces and horizontally to detect lateral forces. In FIG. 29, a mechanical sensing device 1930 is mounted on an adhesive strip 1900 in the center of the box's side panel 1940 and is oriented diagonally to detect longitudinal and lateral forces on a diagonal. The above placement description of FIGS. 28 and 29 mechanical sensing devices 1510 are exemplary.

FIG. 30 shows an exemplary embodiment of sensors 100-600 according to the present invention mounted on an adhesive strip 2000 placed on a plurality of boxes 2010. At least one mechanical sensing device 810 is mounted on the adhesive strip 2000 to detect longitudinal and lateral forces, and can be placed in different locations in order to do so. A mechanical sensing device 2020 is mounted on a portion of the adhesive strip 2000 and oriented vertically on the corner width 2030 of the plurality of boxes 2010 to detect longitudinal forces. Horizontal mechanical sensing devices 810 are mounted on the portions of the adhesive strip 2000 that are placed on the top edges 2050 of the plurality of boxes 2010 to detect lateral forces in opposing directions. The above placement description of FIG. 30 mechanical sensing devices 810 are exemplary.

Figure 31:
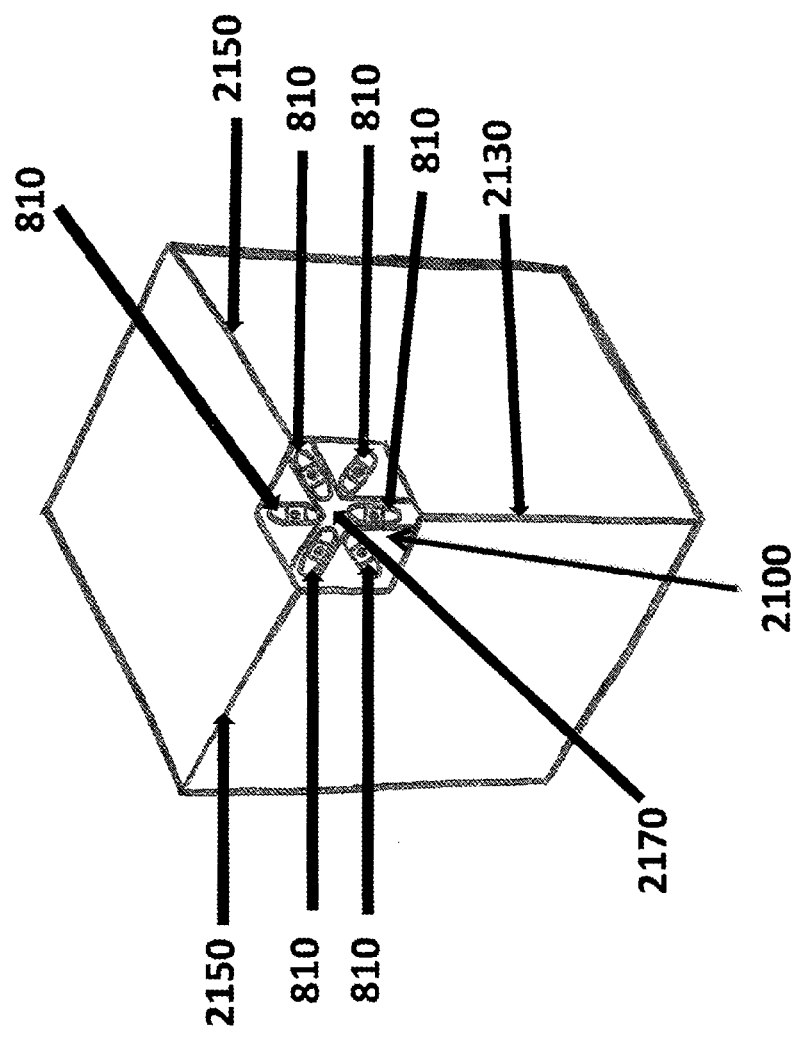
FIG. 31 is a perspective view of a box onto which a plurality of mechanical acceleration sensors according to the present invention are mounted.

FIG. 31 shows an exemplary embodiment of sensors 100-600 according to the present invention mounted on an adhesive strip 2100 placed on a box 2110. At least one mechanical sensing device 810 is mounted on the adhesive strip 2100 to detect longitudinal, lateral, and diagonal forces, and can be placed in different locations in order to do so. A mechanical sensing device 810 is mounted on a portion of the adhesive strip 2100 and oriented vertically on the corner width 2130 of the box 1810 to detect longitudinal forces. Horizontal mechanical sensing devices 810 are mounted on the portions of the adhesive strip 2100 that are placed on the top edges 2150 of the box 2110 to detect lateral forces in opposing directions. Mechanical sensing devices 810 are oriented diagonally off the corner 2170 of the box 2110 and placed in between mechanical sensing devices, 2140 and 2120 to detect longitudinal and lateral forces on a diagonal. The above placement description of FIG. 31 mechanical sensing devices 810 are exemplary.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A sensing device, comprising:
   a housing;
   at least one film extending across the housing, the at least one film dividing the housing into a first compartment and a second compartment;
   at least one mass disposed within the first compartment, the at least one mass being sized to rupture the at least one film;
   a fluid having a first color disposed in the first compartment; and
   a fluid having a second color disposed in the second compartment.

2. The sensing device according to claim 1, wherein the first fluid is disposed within the mass.

3. The sensing device according to claim 1, wherein the at least one film comprises two films, and wherein the at least one mass is disposed between the two films.

4. The sensing device according to claim 3, wherein each of the two films has a concave portion, and wherein the mass is disposed between the concave portions.

5. The sensing device according to claim 1, wherein the at least one film comprises two films and wherein the at least one mass comprises two masses, and wherein the two films are disposed between the two masses.

6. The sensing device according to claim 5, wherein each of the two films has a concave portion, and wherein each mass is disposed within a respective one of the concave portions.

7. The sensing device according to claim 1, wherein the at least one film has a concave portion, and wherein the at least one mass is disposed between the concave portions.

8. The sensing device according to claim 1, wherein the housing has a central portion, and wherein the mass is disposed within the central portion.

9. The sensing device according to claim 8, wherein the housing further comprises a first end and a second end, wherein the central portion is disposed between the first end and the second end, and wherein the first end has a second mass and an end film disposed between the second mass and the central portion.

10. The sensing device according to claim 9, wherein the at least one film is disposed within the central portion, wherein the at least one film comprises a first film and a second film, and wherein the mass is disposed between the first film and the second film.

11. The sensing device according to claim 10, wherein the housing further comprises an extension portion extending orthogonally therefrom between the end portion and the central portion, wherein the extension portion comprises an extension mass and an extension film disposed between the housing and the mass.

12. The sensing device according to claim 11, wherein the film, the end film, and the extension film all extend generally mutually orthogonally with respect to each other.

13. A sensing device comprising:
   an elongate hollow housing;
   a frangible film disposed within the housing, the film dividing the housing into a first compartment and a second compartment;
   a mass disposed within the first compartment, the mass sized to rupture the frangible film upon the application of a force directing the mass into the film, wherein the force is greater than a predetermined force;
   a first fluid disposed in the first compartment, the first fluid having a first color; and
   a second fluid disposed in the second compartment, the second fluid having a second color.

14. The sensing device according to claim 13, wherein the mass is sized such that, upon application of a force greater than the predetermined force, the mass ruptures the film and the first fluid mixes with the second fluid within the housing.

15. The sensing device according to claim 13, wherein the film is sized such that, upon application of a force greater than the predetermined force, the mass ruptures the film and the first fluid mixes with the second fluid within the housing.

16. The sensing device according to claim 13, wherein the sensing device is mounted on a helmet.

17. A sensing device assembly comprising:
   a hollow housing;
   a plurality of films disposed within the housing, the plurality of films dividing the housing into a plurality of compartments;
   a fluid disposed within each of the plurality of compartments such that adjacent compartments contain different colored fluids; and
   means for rupturing the plurality of films such that at least two of the different colored fluids co-mingle.

18. The sensing device assembly according to claim 17, wherein at least two of the plurality of films extend orthogonally with respect to each other.

19. The sensing device assembly according to claim 17, wherein the housing extends in at least two planes.

20. The sensing device assembly according to claim 17, wherein the means for rupturing comprises at least one mass, each of the at least one mass being sized to rupture an adjacent of the plurality of films upon application of a force greater than a predetermined force.

* * * * *